(12) United States Patent
Mahmood et al.

(10) Patent No.: US 12,296,711 B2
(45) Date of Patent: May 13, 2025

(54) BIDIRECTIONAL SERIES CONNECTED TOTEM POLE FOR SPLIT PHASE DCAC

(71) Applicant: Rivian IP Holdings, LLC, Plymouth, MI (US)

(72) Inventors: Muhammad Mobeen Mahmood, Irving, TX (US); Steven Schulz, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/185,287

(22) Filed: Mar. 16, 2023

(65) Prior Publication Data

US 2024/0308386 A1    Sep. 19, 2024

(51) Int. Cl.
*B60L 55/00* (2019.01)
*B60L 53/63* (2019.01)

(52) U.S. Cl.
CPC .............. *B60L 55/00* (2019.02); *B60L 53/63* (2019.02); *B60L 2210/30* (2013.01); *B60L 2210/40* (2013.01)

(58) Field of Classification Search
CPC ...... B60L 55/00; B60L 53/63; B60L 2210/30; B60L 2210/40
See application file for complete search history.

(56) References Cited

U.S. PATENT DOCUMENTS

| | | | |
|---|---|---|---|
| 9,293,978 B2 | 3/2016 | Ayana | |
| 11,557,957 B1* | 1/2023 | Abolhassani | ......... H02M 3/003 |
| 11,757,371 B1* | 9/2023 | Marwali | ............... H02M 7/527 |
| | | | 363/41 |
| 2013/0147431 A1* | 6/2013 | Lim | ......................... H02J 7/02 |
| | | | 320/109 |
| 2015/0207396 A1 | 7/2015 | Ayana | |
| 2020/0122580 A1* | 4/2020 | Zou | ......................... B60L 53/30 |
| 2021/0320595 A1* | 10/2021 | Leibl | ....................... H02M 7/79 |
| 2022/0166308 A1* | 5/2022 | Blane | ................... H02M 1/4225 |
| 2023/0089299 A1* | 3/2023 | Sahoo | ............... H02M 3/33584 |
| | | | 363/148 |
| 2023/0120453 A1 | 4/2023 | Rao | |
| 2023/0120740 A1* | 4/2023 | Lewchuk | .......... H02J 13/00002 |
| | | | 320/109 |

* cited by examiner

*Primary Examiner* — Richard Isla
*Assistant Examiner* — Johali A Torres Ruiz
(74) *Attorney, Agent, or Firm* — BAKERHOSTETLER

(57) ABSTRACT

A power stage circuit with multiple bidirectional AC to DC circuits for bidirectional charging is modified to connect the power stage converters in series for DC to AC applications. The power stage circuit can covert a DC input from a DC power source of a vehicle to an AC output for a power outlet of the vehicle. The power stage circuit uses two lines with a 120 VAC at the power outlet. Using a common neutral line, the AC to DC circuits are connected together to form a split phase power output, and the 120 VAC lines are 180 degrees out of phase to create a 240 VAC source at the power outlet.

18 Claims, 7 Drawing Sheets

BIDIRECTIONAL SERIES CONNECTED TOTEM POLE FOR SPLIT PHASE DCAC

INTRODUCTION

Aspects of the subject technology use a common neutral line that provides a benefit of using existing components for both AC to DC and DC to AC power conversion. Multiple circuits are connected together by a common neutral line for multiple AC power outputs, including AC split phase power output.

SUMMARY

The present description relates generally to power stage circuits that can be used for both AC to DC conversions (e.g., onboard charging of a battery pack of a vehicle) and DC to AC conversions (e.g., discharging the battery pack for AC power for a power outlet of a vehicle) using the same hardware.

In accordance with one or more aspects of the disclosure, an apparatus is described. The apparatus may include a power stage circuit configured to convert an alternating current (AC) input to a direct current (DC) output to charge a battery pack. The power stage circuit may include a first totem pole circuit including a first switch and a second switch. The power stage circuit may further include a second totem pole circuit including a third switch and a fourth switch. The apparatus may further include a first line electrically connected to the first totem pole circuit between the first switch and the second switch. The apparatus may further include a second line electrically connected to the second totem pole circuit between the third switch and the fourth switch. In response to a load on the first line or the second line, the power stage circuit may convert a DC input from the battery pack to an AC output at the load. The apparatus may be implemented in a vehicle, and the battery pack may be used as a power source for one or more motors of the vehicle.

The first line may carry a first AC voltage, and the second line may carry a second AC voltage that is 180 degrees out of phase with respect to the first AC voltage. The first AC voltage may be 180 degrees out of phase with respect to the second AC voltage. The first line and the second line may electrically connect to a power outlet configured to receive the load. The first line and the second line may be configured to provide 120 VAC or 240 VAC to the power outlet. The first line may connect to a first AC to DC circuit of the power stage circuit, and the second line may connect to a second AC to DC circuit of the power stage circuit.

The apparatus may further include a third line. The first AC to DC circuit may include a third totem pole circuit. The second AC to DC circuit may include a fourth totem pole circuit. The third line may electrically connect to the third totem pole circuit and the fourth totem pole circuit. The third line may include a common neutral line with respect to the first line and the second line.

In accordance with one or more other aspects of the disclosure, a vehicle is described. The vehicle may include a port. The vehicle may further include a power stage circuit configured to: receive, on a first line, a first alternating current (AC) input from the port and convert the first AC input to a first direct current (DC) output, and receive, on a second line, a second AC input from the port and convert the second AC input to a second DC output. The vehicle may further include a battery pack configured to store energy from the first DC output and the second DC output. The vehicle may further include a power outlet. In response to a load at the power outlet, the power stage circuit i) converts a DC input from the battery pack to an AC output and ii) provides the AC output, via at least one of the first line or the second line, to the power outlet.

The power stage circuit may further include a first AC to DC circuit connected to the first line, as well as a second AC to DC circuit connected to the second line. The first AC to DC circuit and the second AC to DC circuit may connect in series.

The power stage circuit may include a first totem pole circuit including a first switch and a second switch, as well as a second totem pole circuit including a third switch and a fourth switch. The first line may connect to the first totem pole circuit between the first switch and the second switch. The second line may connect to the second totem pole circuit between the third switch and the fourth switch.

The power stage circuit may further include a third totem pole circuit connected in parallel with the first totem pole circuit. The power stage circuit may further include a fourth totem pole circuit connected in parallel with the second totem pole circuit. The power stage circuit may further include a third line electrically connected to the third totem pole circuit and the fourth totem pole circuit.

The third line may be configured to provide a common neutral line with respect to the first line and the second line. The first line may carry a first AC voltage. The second line may carry a second AC voltage that is 180 degrees out of phase with respect to the first AC voltage. The power stage circuit may be configured to provide, via the port, the AC output to a power grid.

In accordance with one or more other aspects of the disclosure, a power stage circuit is described. The power stage circuit may include a first AC to DC circuit coupled to a battery pack. The first AC to DC circuit may include a first circuit having a first set of switches configured to switch at a first switching frequency. The first AC to DC circuit may further include a second circuit having a second set of switches configured to switch at a second switching frequency different from the first switching frequency. The power stage circuit may further include a second AC to DC circuit coupled to the battery pack. The second AC to DC circuit may include a third circuit having a third set of switches configured to switch at the first switching frequency, as well as a fourth circuit having a fourth set of switches configured to switch at the second switching frequency. The power stage circuit may further include a first line electrically coupled to the first circuit. The power stage circuit may further include a second line electrically coupled to the third circuit. The power stage circuit may further include a third line electrically coupled to the second circuit and the fourth circuit. The power stage circuit may be implemented in a vehicle.

The first switching frequency may be greater than the second switching frequency. The first AC to DC circuit and the second AC to DC circuit may each be configured to convert a DC input from the battery pack to an alternating current (AC) output. The AC output may be provided by a first AC voltage on the first line, as well as a second AC voltage on the second line. The second AC voltage may be 180 degrees out of phase with respect to the first AC voltage. The third line may include a neutral line.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject technology described herein relate to power stage circuits used in bidirectional power conversion. In this context, bidirectional power conversion refers to grid to vehicle (G2V) and vehicle to load (V2L) applications. Power stage circuits described herein can convert alternating current (AC) to direct current (DC) to charge a DC power source (e.g., battery pack). Based on additional modifications, the power stage circuit can convert the DC power from the DC power source to AC power for one or more power outlets. Moreover, the modifications are designed create a split phase AC output using a common neutral line for two AC voltage lines, which connects two power stages in series without modifying the existing power stage topology. Beneficially, both 120 Volt (V) AC and 240 VAC are available at the power outlet(s). The subject technology may be integrated into vehicles, including electric vehicles in which the DC power source is used to drive one or more electric motors for propulsion of the vehicle.

Figure 1:
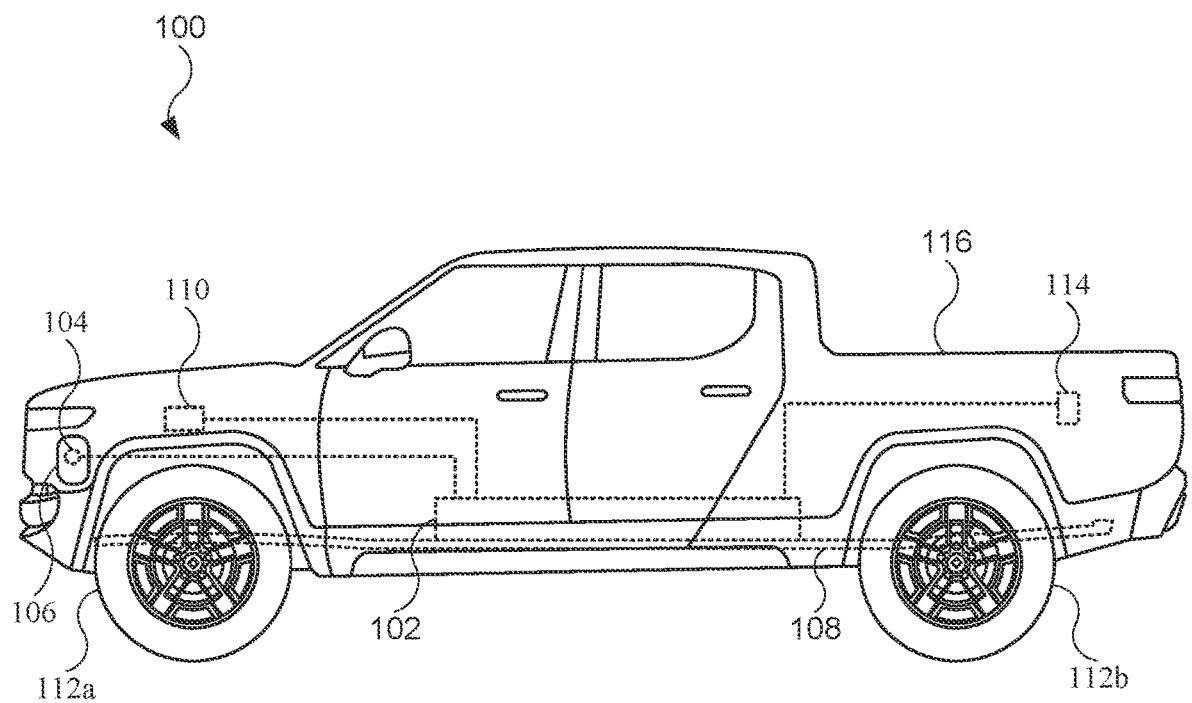
FIG. 1 illustrates an embodiment of a vehicle with a battery pack, in accordance with aspects of the present disclosure.

According to some embodiments, for example as shown in FIG. 1, an example implementation of a movable apparatus takes the form of a vehicle 100. In some embodiments, the vehicle 100 is a sport utility vehicle. In the embodiment shown in FIG. 1, the vehicle 100 is a truck. Generally, the vehicle 100 may take the form of any motorized vehicle, including motorized vehicles with an internal combustion engine and/or one or more electric motors. In this regard, other implementations of the vehicle 100 may include land-based vehicles, such as a car (e.g., sedan, hatchback), a van, a motorcycle, a motorized scooter, or a commercial truck, as non-limiting examples. Still further, other implementation of the vehicle 100 may include sea or air transport vehicles, planes, helicopters, submarines, boats, or drones, as non-limiting examples.

As shown, the vehicle 100 includes a battery pack 102. The battery pack 102 may be coupled (e.g., electrically coupled) to one or more electrical systems of the vehicle 100 to provide power to the one or more electrical systems. The battery pack 102 may include one or more battery modules (not shown in FIG. 1), with each of the one or more battery modules carrying several battery cells. In some embodiments, the battery pack 102 does not include any battery modules and takes the form of a cell-to-pack configuration. Also, the battery cells of the battery pack 102 may include rechargeable battery cells, and accordingly, the battery pack 102 may be referred to as a rechargeable battery pack. In this regard, the vehicle 100 includes a port 104 (e.g., charge port) designed to receive a cable connector (not shown in FIG. 1) that provides power (e.g., AC power) that is converted to DC power to charge the battery pack 102. The port 104 can be accessed by moving a cover 106. The vehicle 100 may include a chassis 108 used to support the battery pack 102 and various other components (not shown in FIG. 1) of the vehicle 100, such as the suspension and differential, as non-limiting examples.

The battery pack 102 may couple to a motor 110, representative of one or more motors of the vehicle 100. In some embodiments, the motor 110 is an internal combustion engine. In the embodiment shown in FIG. 1, the motor 110 is an electric motor. In this regard, vehicle 100 can use energy (e.g., electrical energy) stored the battery pack 102 to supply power to the motor 110 to drive (e.g., rotationally drive) a wheel 112a and a wheel 112b, each representative of one or more additional wheels of the vehicle 100. By driving the wheels 112a and 112b, the vehicle 100 can move in various directions. In some embodiments, the motor 110 represents a single motor of the vehicle 100. In other embodiments, the vehicle 100 includes a dual motor configuration in which the motor 110 and an additional motor are used to drive the wheel 112a (a front wheel) and the wheel 112b (a rear wheel), respectively, as well as an additional respective front and rear wheel. Further, in other embodiments, the vehicle 100 includes a quad motor configuration in which the motor 110 and three additional motors drive a respective wheel of a four-wheel configuration of the vehicle 100.

Also, the vehicle 100 may further include a power outlet 114, representative of one or more power outlets of the vehicle 100. The power outlet 114 may include one or more plugs designed to receive a load (e.g., device that consumes/uses electrical energy, such as an appliance or consumer device). The vehicle 100 can convert the stored DC power in the battery pack 102 to AC power and provide the AC power at the power outlet 114 into which the load is plugged. While the power outlet 114 is shown in a specific location (e.g., a bed 116 of the vehicle 100), the power outlet 114 can generally be placed in one or more other locations of the vehicle 100.

Figure 2:
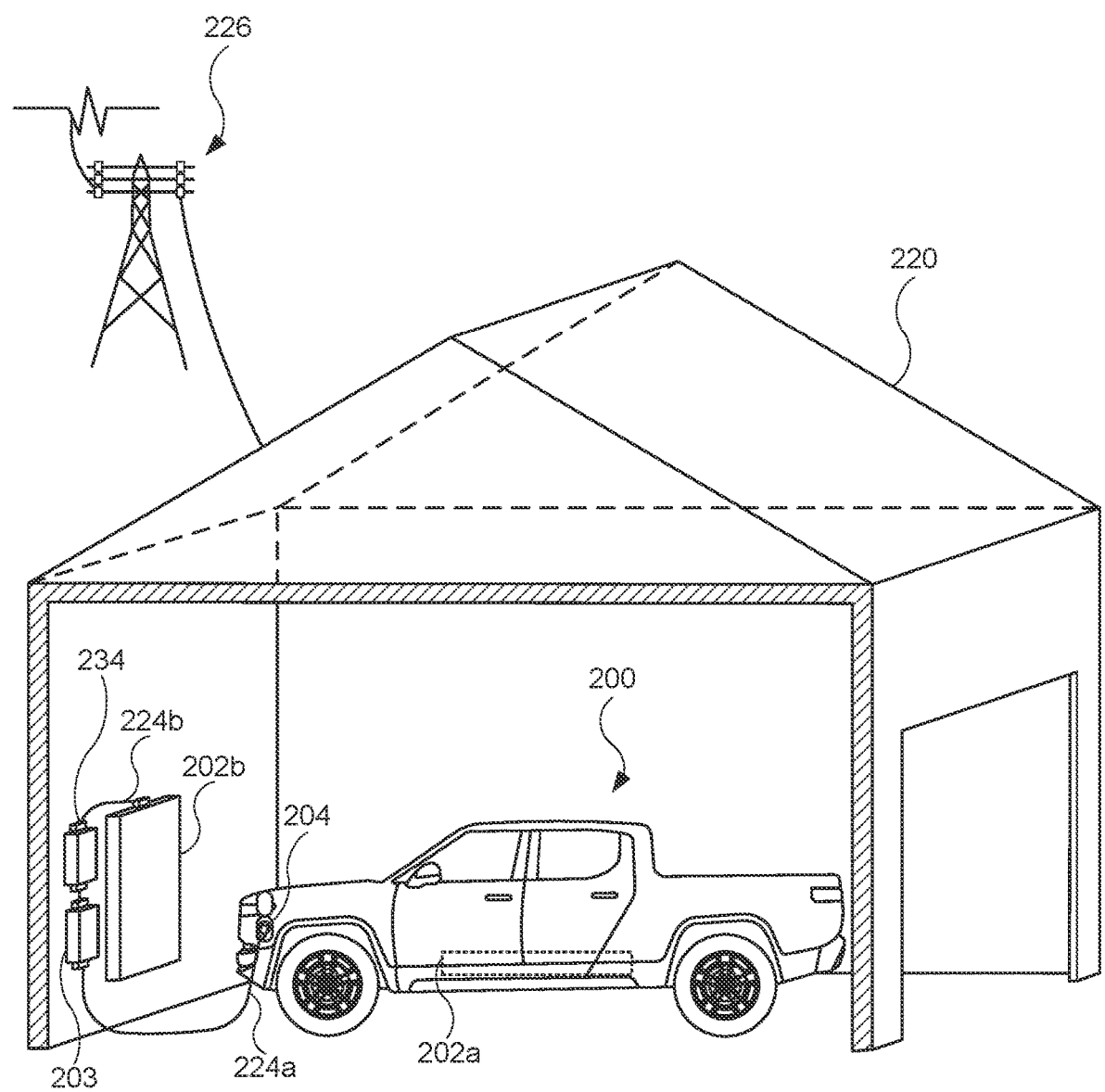
FIG. 2 illustrates an embodiment of a building with a battery pack, showing a vehicle within the building, in accordance with aspects of the present disclosure.

Referring to FIG. 2, a vehicle 200 is located in a building 220 (shown as a partial cross section) and a battery pack 202b located in the building 220. The vehicle 200 and the battery pack 202b may include any features and characteristics described herein for a vehicle and a battery pack, respectively. In some embodiments, the battery pack 202b is a wall-mounted battery pack. The building 220 may generally include any type of building for storing vehicles, such as a residential building or a commercial building, as non-limiting examples. Also, in one or more implementations, the battery pack 202b may be mounted to a wall of the building 220, as shown in FIG. 2. The battery pack 202b can couple (e.g., electrically couple) to electric vehicle supply equipment 203 (EVSE) located in the building 220. The electric vehicle supply equipment 203 can interface (e.g., electrically couple) with an electrical power system, such as solar power source, or a wind power source. As shown in FIG. 2, the electric vehicle supply equipment 203 interfaces with a power grid 226. The power grid 226 may be part of an electrical grid of a city, town, or other geographic region. Using the power grid 226, the electric vehicle supply equipment 203 a can provide power a battery pack 202a in the vehicle 200 by, for example, a cable 224a. As shown, the cable 224a is connected to a port 204 of the vehicle 200. As will be discussed further below, the vehicle 200 may include a power stage circuit (not shown in FIG. 2) used to convert power received from the electric vehicle supply equipment 203 to DC power that is used to power the battery pack 202a of the vehicle 200. Also, the electric vehicle supply equipment 203 can be used to charge the battery pack 202b in the building 220. Using the electric vehicle supply equipment 203 and a power stage circuit 234 connected to the battery pack 202b by a cable 224b, the battery pack 202b can be charged by the power grid 226.

The battery pack 202b can recharge and store energy received from the power grid 226 (or other electrical power system described herein). In some embodiments, the stored energy in the battery pack 202b can later be used to charge the battery pack 202a during, for example, instances when solar power or wind power is not available, in the case of a regional or local power outage for the building 220, and/or during a period of high rates for access to the power grid 226. This may require an additional cable (not shown in FIG. 2). Conversely, in some embodiments, the stored energy in the battery pack 202a in the vehicle 200 can be used to charge the battery pack 202b in the building 220. Also, in one or more implementations, each of the battery packs 202a and 202b can be used in bidirectional charging applications. For example, in addition to being charged by the power grid 226, the stored energy in the battery pack 202b can be provided back to the power grid 226.

The stored energy in the battery pack 202b in the building 220 can provide power to one or more loads (e.g., lights, lamps, appliances, fans, heaters, air conditioners) in the building 220. Alternatively, using an additional electrical connection (not shown in FIG. 2) connected to the port 204 of the vehicle 200 and to the building 220, the stored energy in the battery pack 202a of the vehicle 200 can be used to provide power to one or more loads in the building 220, or can provide power back to the power grid 226. Beneficially, the stored energy in the battery packs 202a and 202b can be used to power the loads in the building 220 during, for example, a period of high energy rates from the power grid 226 and can be sold back to the owner of the power grid 226.

Figure 3A:
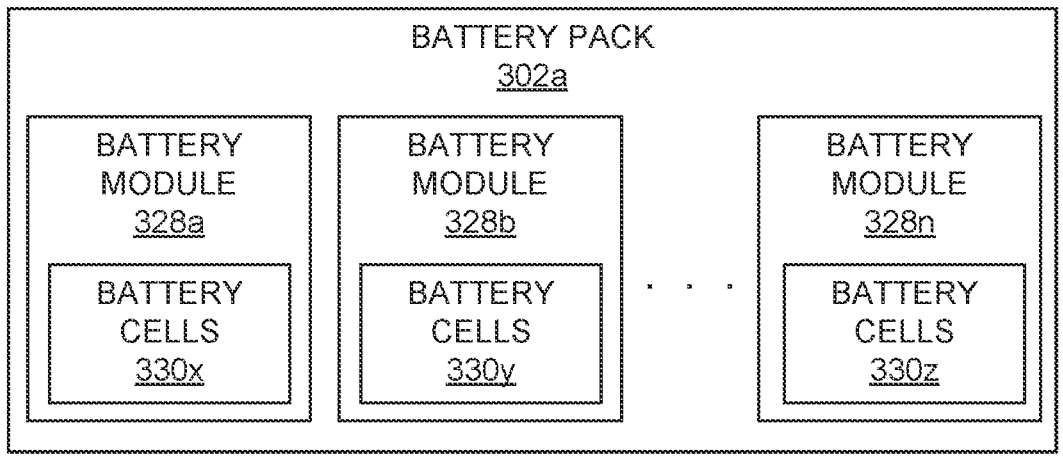
FIGS. 3A and 3B illustrate block diagrams of respective embodiments of a battery pack, in accordance with aspects of the present disclosure.
Figure 3B:
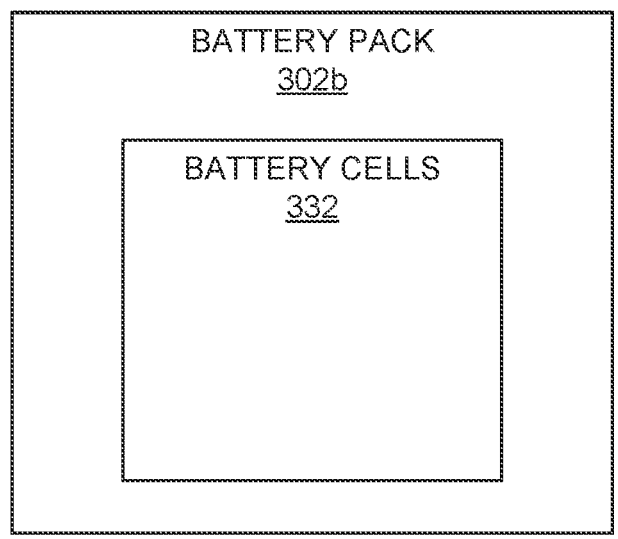

FIGS. 3A and 3B illustrate block diagrams of battery packs, which may be used in battery packs shown and/or described herein. The battery packs shown and described in FIGS. 3A and 3B can store energy and provide a DC output. Referring to FIG. 3A, a battery pack 302a includes several battery modules, each with several battery cells. As shown, the battery pack 302a includes a battery module 328a, a battery module 328b, and a battery module 328n, representing n battery modules of the battery pack 302a. The value of n may include an integer equal to three or more. However, in some embodiments (not shown in FIG. 3A), a battery pack may include one or two battery modules.

Each battery module may include several battery cells. As shown, each of the battery module 328a, the battery module 328b, and the battery module 328n includes battery cells 330x, battery cells 330y, and battery cells 333z, respectively. Each of the battery cells 330x, 330y, and 330z may represent several hundred, including several thousand, battery cells. Also, each of the battery cells 330x, 330y, and 330z may include the same number of battery cells (e.g., in each respective battery module), or may include a different number of battery cells. Also, each of the battery cells 330x, 330y, and 330z may be provided in a variety of form factors, shapes, or sizes. For example, battery cells described herein (representative of one or more battery cells of the battery cells 330x, 330y, and 330z) may include a cylindrical form factor. In this regard, a battery cells may include a diameter (e.g., cylinder diameter, battery cell diameter) and length (e.g., cylinder length). Further, battery cells described herein may include dimensional information derived from a 4-number code. For example, in some embodiments, a battery pack includes an XXYY battery cell, in which "XX" and "YY" refers to a diameter and length, respectively, of the battery cell. Some battery cells described herein may include a "2170" battery cell, in which the diameter is 21 millimeters (mm) and the length is 70 mm. Alternatively, some battery cells described herein may include a "4680" battery cell, in which the diameter is 46 mm and the length is 80 mm. The foregoing examples of dimensional characteristics for battery cells should not be construed as limiting, as battery cells described herein with a cylindrical form factor may include various dimensions. For example, the diameter and the length of a battery cell may be greater than 46 mm and 80 mm, respectively.

Battery cells described herein may include additional form factors. For example, battery cells (representative of one or more battery cells of the battery cells 330x, 330y, and 330z) may be implemented as a prismatic cell that includes a rigid or semi-rigid material, such that a housing of the battery cell is rigid or semi-rigid (e.g., not easily deformed or manipulated into another shape or form factor). Alternatively, battery cells (representative of one or more battery cells of the battery cells 330x, 330y, and 330z) may be implemented as a pouch cell in which a housing of the battery cell includes a flexible, malleable, or non-rigid material such that the housing can be bent, deformed, manipulated into another form factor or shape.

Referring to FIG. 3B, a battery pack 302b includes battery cells 332. In this regard, the battery pack 302b does include battery modules. Rather, the battery cells 332 represent a cell-to-pack configuration. Beneficially, the battery pack 302b may provide additional space for the battery cells 332 and less complexity due to the removal of battery modules. The battery cells 332 may include any number of battery cells described herein for battery cells and may take any form factor described herein for battery cells.

Figure 4:
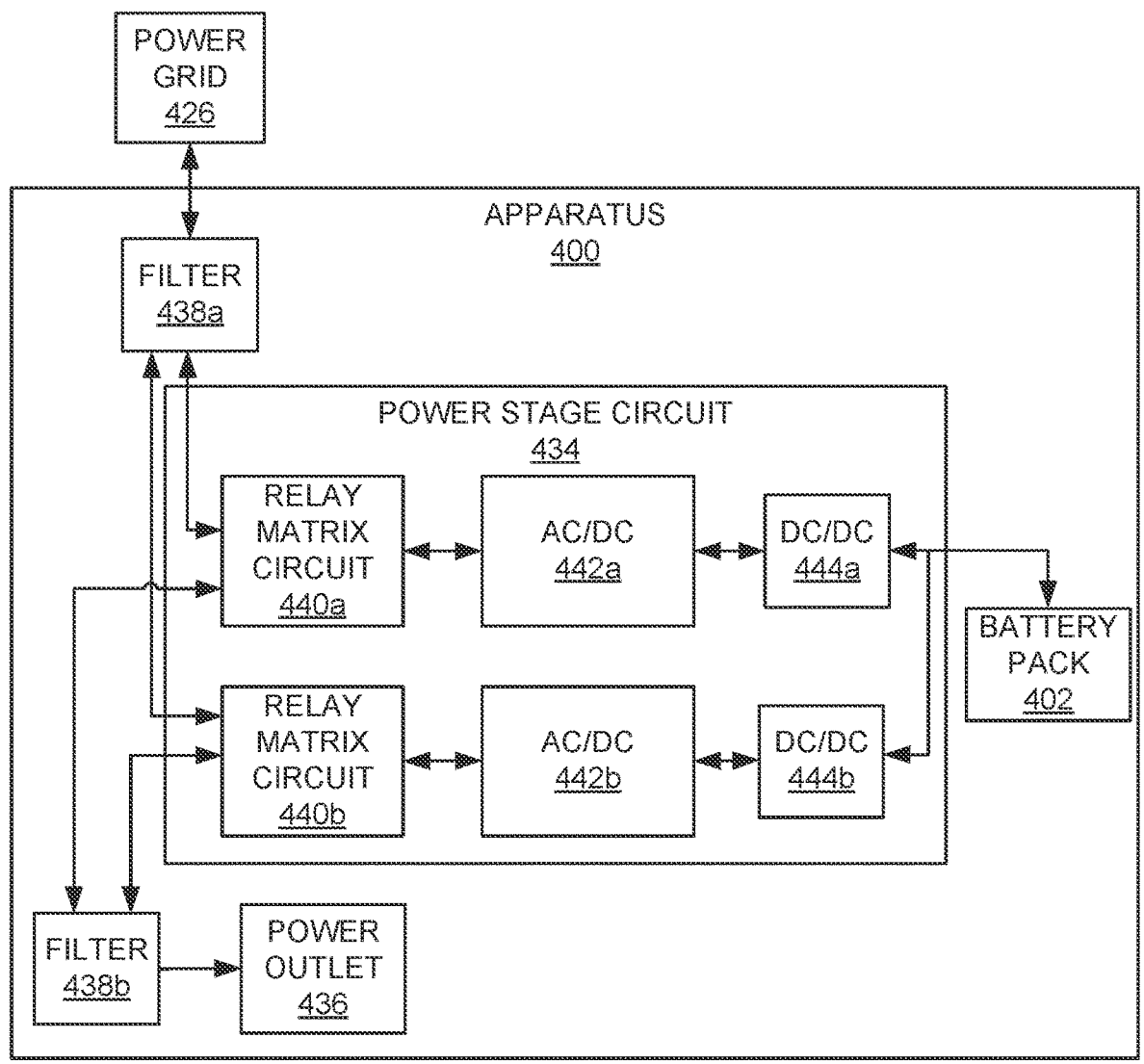
FIG. 4 illustrates a block diagram of an apparatus with a power stage circuit for AC to DC and DC to AC applications, in accordance with aspects of the present disclosure.

Referring to FIG. 4, a block diagram of an apparatus 400 is shown. In some embodiments, the apparatus 400 is a vehicle (e.g., vehicle 100, shown in FIG. 1). As shown, the apparatus 400 is connected to a power grid 426 designed to provide AC power. In some embodiments, the apparatus 400 can supply AC power back to the power grid 426. In this regard, the apparatus 400 and the power grid 426 can be used in, for example, G2V and vehicle to everything (V2X)

applications. The apparatus 400 includes a power stage circuit 434 and a battery pack 402. The battery pack 402 may include any features and characteristics described herein for a battery pack.

The power stage circuit 434 is designed to receive an AC input from the power grid 426 and convert the AC power to a DC output to charge the battery pack 402. The apparatus 400 further includes a power outlet 436, representing one or more power outlets of the apparatus 400. The power stage circuit 434 is further designed to convert a DC input from the battery pack 402 to an AC output to provide AC split phase power to the power outlet 436, thus allowing the power outlet 436 to power a load connected to the power outlet 436.

The apparatus 400 may include several filters. For example, the apparatus 400 includes a filter 438a and a filter 438b. In some embodiments, the filter 438a is an onboard charger (OBC) electromagnetic interference (EMI) filter. In this regard, the filter 438a can protect the power stage circuit 434 from EMI, as well as protect other components of the apparatus 400 from EMI generated by the power stage circuit 434. In some embodiments, the filter 438a can be used for both G2V and V2L power flow through a charge port of a vehicle. Alternatively, in some embodiments, the filter 438a includes passive components (e.g., capacitors, inductors, etc.) that decrease distortion voltage and/or harmonic currents.

In some embodiments, the filter 438b is a DC to AC EMI filter. In this regard, the filter 438b can protect the power outlet 436 from unwanted EMI. The filter 438b may include any features and components described herein for the filter 438a.

The power stage circuit 434 may include a relay matrix circuit 440a, an AC to DC circuit 442a, and a DC to DC circuit 444a. Additionally, the power stage circuit 434 may include a relay matrix circuit 440b, an AC to DC circuit 442b, and a DC to DC circuit 444b. In some embodiments, each of the AC to DC circuits 442a and 442b (representative of other AC to DC circuits shown or described herein) takes the form of a power factor correction circuit designed to increase a ratio of working power to apparent power by shaping input current to be in phase with line voltage. In some embodiments, each of the AC to DC circuits 442a and 442b takes the form of an electrical or electromechanical device that converts electrical energy from one form to another. Further, in some embodiments, each of the AC to DC circuits 442a and 442b takes the form of a bidirectional AC to DC circuit, and as a result, the AC to DC circuits 442a and 442b can each convert both AC power to DC power and convert DC power to AC power.

In some embodiments, each of the DC to DC circuit 444a and 444b (representative of other DC to DC circuits shown or described herein) takes the form of a bidirectional DC to DC circuit, and as a result, the DC to DC circuits 444a and 444b can each convert DC power (e.g., first DC voltage level) to DC power (e.g., second, different DC voltage level) and convert DC power (e.g., second DC voltage level) to DC power (e.g., first DC voltage level). Accordingly, in some embodiments, each of the DC to DC circuits 444a and 444b takes the form of an electrical or electromechanical device that converts DC at one voltage level to a different voltage level. As non-limiting examples, each of the DC to DC circuits 444a and 444b may include a boost converter circuit, a buck converter circuit, or a buck-boost converter circuit. Also, in some embodiments, each of the DC to DC circuits 444a and 444b includes an input and in output that lack a direct conduction path and have independent ground.

In this regard, the DC to DC circuits 444a and 444b may include a transformer that uses an electromagnetic field to transfer power to and from the battery pack 402. As a result, the AC to DC circuit 442a may be coupled (e.g., indirectly coupled) to the battery pack 402 by way of the DC to DC circuits 444a and 444b, respectively. Further, the AC to DC circuits 442a and 442b may provide a DC output that is not a desirable DC voltage level for charging the battery pack 402. Beneficially, each of the DC to DC circuits 444a and 444b converts the DC voltage level from the AC to DC circuits 442a and 442b, respectively, to a desirable DC voltage level to charge the battery pack 402. The voltage level is based on the battery pack 402. For example, in some embodiments, the DC to DC circuits 444a and 444b provide at least 400 VDC to charge the battery pack 402. In some embodiments, the DC to DC circuits 444a and 444b provide at least 800 VDC.

In some embodiments, each of the relay matrix circuits 440a and 440b take the form of a configuration relay matrix. In this regard, the relay matrix circuits 440a and 440b may include one or more relay circuits designed to switch current based on the applications. For example, during G2V charging applications, the relay matrix circuits 440a and 440b can switch and permit AC power from the power grid 426 to the AC to DC circuit 442a and the AC to DC circuit 442b, respectively. Conversely, during V2G or V2L applications, the relay matrix circuits 440a and 440b can switch and permit AC power from the AC to DC circuit 442a and the AC to DC circuit 442b, respectively, to the power grid 426. Additionally, when a load is connected to the power outlet 436, the relay matrix circuits 440a and 440b can switch and permit AC power from the AC to DC circuit 442a and the AC to DC circuit 442b, respectively, to the power outlet 436 to power the load. Also, the AC to DC circuit 442a and the AC to DC circuit 442b may be modular circuits that are connected together in series to provide a split phase AC output for the power outlet 436. This will be shown and described in further detail below.

In an exemplary implementation, the AC to DC circuits 442a and 442b convert an AC input (e.g., provided by the power grid 426) to a DC output, which is further converted by the DC to DC circuit 444a and the DC to DC circuit 444b, respectively, and the resulting DC power is used to charge the battery pack 402. Additionally, based on their respective bidirectional capabilities, the AC to DC circuits 442a and 442b are designed to convert an DC input from the DC to DC circuit 444a and the DC to DC circuit 444b, respectively, provided (e.g., indirectly provided) by the DC power stored on the battery pack 402 to an AC output, which can be used to provide AC power back to the power grid 426 or to provide AC power to the power outlet 436.

Figure 5:
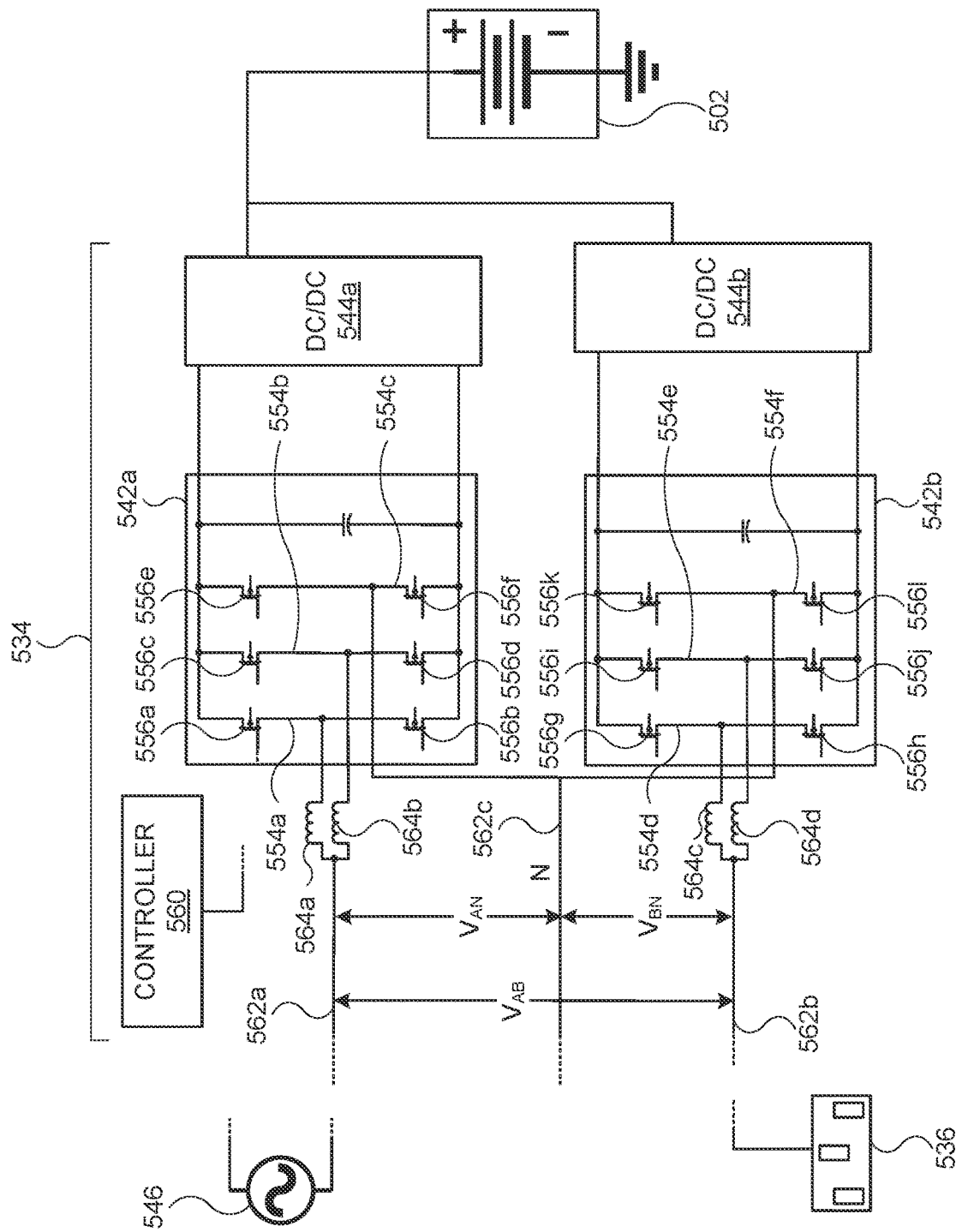
FIG. 5 illustrates a circuit diagram of a power stage circuit, in accordance with aspects of the present disclosure.

Referring to FIG. 5, an exemplary circuit diagram for a power stage circuit 534 is shown. The power stage circuit 534 shown and described herein provides additional components and features that may be implemented in the power stage circuit 434 (shown in FIG. 4). In this regard, the power stage circuit 534 may be implemented in an apparatus (e.g., apparatus 400, shown in FIG. 4). As shown, the power stage circuit 534 may include an AC to DC circuit 542a and an AC to DC circuit 542b. Each of the AC to DC circuits 542a and 542b shown and described herein provides additional components and features that may be implemented in the AC to DC circuits 442a and 442b, respectively (both shown in FIG. 4). The power stage circuit 534 is designed to receive AC power from an AC power source 546, which may include a power grid. Using the AC to DC circuits 542a and 542b, the power stage circuit 534 can convert the received AC power to a DC power, which is further converted by a DC to DC circuit 544a and a DC to DC circuit 544b, respectively, and the resulting DC power is used to charge a battery pack 502, which may include any features described herein for a battery pack. Each of the DC to DC circuits 544a and 544b of the power stage circuit 534 may include any features shown and described herein for a DC to DC circuit (e.g., DC to DC circuits 444a and 444b, respectively, shown in FIG. 4). Accordingly, each of the DC to DC circuits 544a and 544b may include an isolated DC to DC converter. Further, the AC to DC circuits 542a and 542b may be coupled (e.g., indirectly coupled) to the battery pack 502 by way of the DC to DC circuits 544a and 544b, respectively. Further, the power stage circuit 534 can convert the DC power stored on the battery pack 502 to AC power to power a power outlet 536, representative of one or more power outlets. For example, using the DC to DC circuits 544a and 544b and subsequently the AC to DC circuits 542a and 542b, the power stage circuit 534 can convert the DC power stored on the battery pack 502 to AC power and provide the AC power back to the AC power source 546.

Each of the AC to DC circuits 542a and 542b includes several switches. For example, the AC to DC circuit 542a includes a circuit 554a, a circuit 554b, and a circuit 554c. In some embodiments, each of the circuits 554a, 554b, and 554c takes the form of a totem pole circuit. In this regard, each of the circuits 554a, 554b, and 554c may include a pair of switches (e.g., transistor switches). As shown, the circuit 554a includes a switch 556a and a switch 556b, the circuit 554b includes a switch 556c and a switch 556d, and the circuit 554c includes a switch 556e and a switch 556f. Each of the aforementioned switches may take the form of a transistor switch, such as a metal-oxide-semiconductor field-effect transistor (MOSFET) switch, as a non-limiting example. Also, the circuits 554a and 554b may be connected in parallel or interleaved.

Similarly, the AC to DC circuit 542b includes a circuit 554d, a circuit 554e, and a circuit 554f, each of which may take the form of a totem pole circuit. In this regard, each of the circuits 554d, 554e, and 554f may include a pair of switches (e.g., transistor switches). As shown, the circuit 554d includes a switch 556g and a switch 556h, the circuit 554e includes a switch 556i and a switch 556j, and the circuit 554f includes a switch 556k and a switch 556l. Each of the switches of the AC to DC circuit 542b may take any form of a transistor switch described for the switches of the AC to DC circuit 542a. Also, the circuits 554d and 554e may be connected in parallel or interleaved.

In order to control/operate the switches of the AC to DC circuits 542a and 542b, a controller 560 can be used. The controller 560 may be implemented as a control circuit integrated with the power stage circuit 534 or may be separate from the power stage circuit 534. In some embodiments, the controller 560 includes processing circuitry, such as a central processing unit, a microelectromechanical (MEMS) controller, one or more microcontrollers, an application-specific integrated circuit, or a combination thereof. The controller 560 can control switching functionality (e.g., whether the switch is open or closed) of the switches. In this regard, the controller 560 can be programmed to operate a pair of switches on a circuit to perform various duties (e.g., rectifier in AC to DC conversion, transmission of control signals). Additionally, the controller 560 can be programmed to control the switching frequency (e.g., the rate at which the switches open and close). In some embodiments, the controller 560 includes a pulse width modulation (PWM) controller that provides switching frequency control signals to the switches. Moreover, the switching frequency for the switches can vary. For example, the switching frequency for the switches 556a and 556b on the circuit 554a and the switching frequency for the switches 556c and 556d on the circuit 554b may switch, based on control signals from the controller 560, at a frequency approximately in the range of 80 to 150 kilohertz (kHz). In some embodiments, the switching frequency is 120 kHz. The switching frequency may be used for boost conversion (e.g., DC to DC) operations, as a non-limiting example. Conversely, the switching frequency for the switches 556e and 556f on the circuit 554c may switch, based on control signals from the controller 560, at a frequency approximately in the range of 50 to 60 Hertz (Hz). In some embodiments, the switching frequency is 60 Hz. Similarly, the switches 556g and 556h of the circuit 554d and the switches 556i and 556j of the circuit 554e may switch, based on control signals from the controller 560, at a frequency approximately in the range of 80 to 150 kHz, including a switching frequency of 120 kHz. Also, the switches 556k and 556l of the circuit 554f may switch, based on control signals from the controller 560, at a frequency approximately in the range of 50 to 60 Hz, including a switching frequency of 60 Hz. Accordingly, switches on some circuits (e.g., switches 556a and 556b on the circuit 554a) are switched at a higher switching frequency as compared to switches on other circuits (e.g., switches 556e and 556f on the circuit 554c).

Additionally, the power stage circuit 534 includes several lines (e.g., power-carrying lines). For example, the power stage circuit 534 includes a line 562a connected to the AC to DC circuit 542a, a line 562b connected to the AC to DC circuit 542b, and a line 562c connected to the AC to DC circuit 542a and the AC to DC circuit 542b. The term "line" or "lines" as used in the detailed description and in the claims represents a wire, wiring, or metal trace that is capable of transmitting electrical current and connecting electrical components together to form one or more electrical connections. As shown, the line 562a is connected to the circuit 554a between the switch 556a and the switch 556b, and is also connected to the circuit 554b between the switch 556c and the switch 556d. Also, an inductor 564a and an inductor 564b are connected to the line 562a. The inductors 564a and 564b are connected to the circuits 554a and 554b, respectively. Further, the line 562b is connected to the circuit 554d between the switch 556g and the switch 556h, and is also connected to the circuit 554e between the switch 556i and the switch 556j. Also, an inductor 564c and an inductor 564d are connected to the line 562b. The inductors 564c and 564d are connected to the circuits 554d and 554e, respectively.

Based on the aforementioned switching frequency, the lines 562a and 562b are connected to circuits in which the respective switches of the circuits are operated to switch with a relatively high switching frequency (e.g., approximately in the range of 80 to 150 kHz). As further shown, the line 562c is connected to the circuit 554c (of the AC to DC circuit 542a) between the switch 556c and the switch 556f, and is also connected to the circuit 554f (of the AC to DC circuit 542b) between the switch 556k and the switch 556l. Accordingly, the lines 562c is connected to circuits in which the respective switches of the circuits are operated to switch with a relatively low switching frequency (e.g., approximately in the range of 50 to 60 Hz). Also, the line 562c may connect the AC to DC circuits 542a and 542b together in series.

In some embodiments, the lines 562a, 562b, and 562c are used as an AC power circuit. For example, each of the lines 562a and 562b may represent two lines (e.g., poles L1 and L2, respectively) of an AC circuit. Further, the line 562c may represent a neutral (N) line of the AC circuit. Moreover, the line 562c, as a neutral line, is a common neutral line that is common to the respective AC voltages on the lines 562a and 562b. In this regard, the line-to-neutral voltage between the line 562a and 562c is $V_{AN}$. Also, the line-to-neutral voltage between the line 562b and 562c is $V_{BN}$. Each of the AC to DC circuits 542a and 542b is designed to convert a DC input from the DC to DC circuit 544a and the DC to DC circuit 544b, respectively, provided (e.g., indirectly provided) by the DC power stored on the battery pack 502 to an AC output, which can be used to provide AC power back to the AC power source 546 or to provide AC power to the power outlet 536. In some embodiments, $V_{AN}$ and $V_{BN}$ (representing respective voltages on the lines 562a and 562b) are each equal to 120 VAC. Also, in some embodiments, the AC voltage on the line 562a is out of phase with respect to the AC voltage on the line 562b. For example, the AC voltage on the line 562a may be 180 degrees out of phase with respect to the AC voltage on the line 562b. As a result, the power stage circuit 534 may provide an AC split phase output in which the line-to-line voltage (e.g., voltage differences between the respective AC voltages on the lines 562a and 562b) is $V_{AN}-V_{BN}$. Accordingly, when $V_{AN}$ and $V_{BN}$ are each equal to 120 VAC and out of phase by 180 degrees, $V_{AB}=V_{AN}-V_{BN}=120$ VAC$-(-120$ VAC$)=240$ VAC. The controller 560 may provide control signals to at least some of the switches of the AC to DC circuits 542a and 542b to achieve a desired phase difference between the respective AC voltages on the lines 562a and 562b.

By connecting the AC to DC circuits 542a and 542b using the line 562c, the power stage circuit 534 can provide two lines carrying 120 VAC to the power outlet 536. Additionally, should a load connected to the power outlet 536 require additional voltage, the AC split phase power output configuration of the power stage circuit 534 can provide 240 VAC. When the power stage circuit 534, the power outlet 536, and the battery pack 502 are implemented in a vehicle (not shown in FIG. 5), the vehicle can use the power stage circuit 534, including the various circuits and features of the power stage circuit 534 shown and described herein, to receive a DC input from the battery pack 502 and generate an AC output (from the DC input) to the power outlet 536 at 120 VAC and 240 VAC. Beneficially, the vehicle can be located in, for example, a remote area and provide AC voltage from a DC voltage source without a connection to an external power source.

Figure 6:
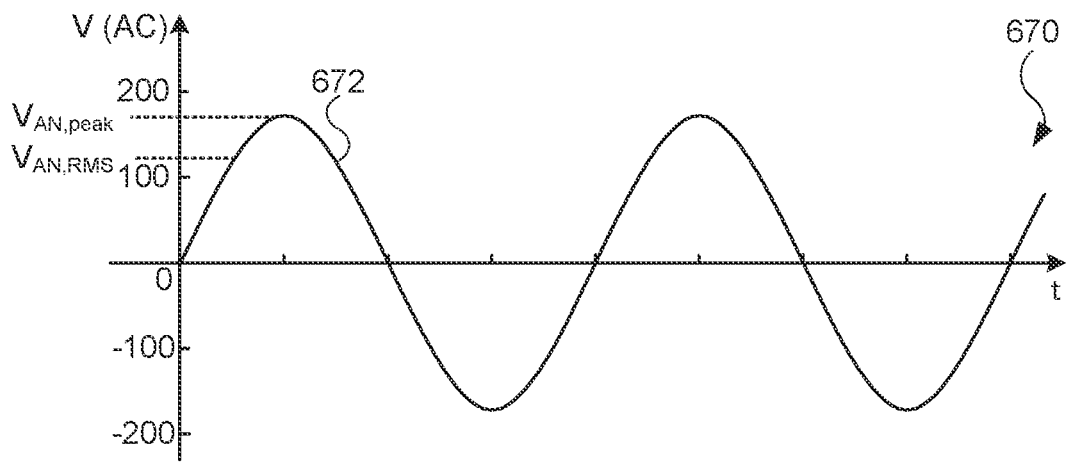
FIG. 6 illustrates a graph showing a curve for a line-to-neutral voltage, in accordance with aspects of the present disclosure.
Figure 7:
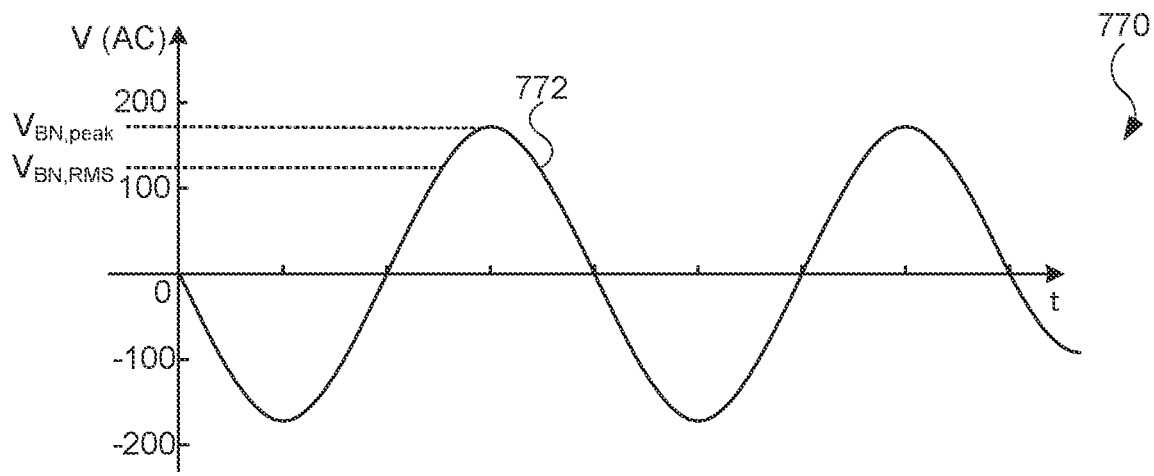
FIG. 7 illustrates an additional graph showing a curve for an additional line-to-neutral voltage, in accordance with aspects of the present disclosure.
Figure 8:
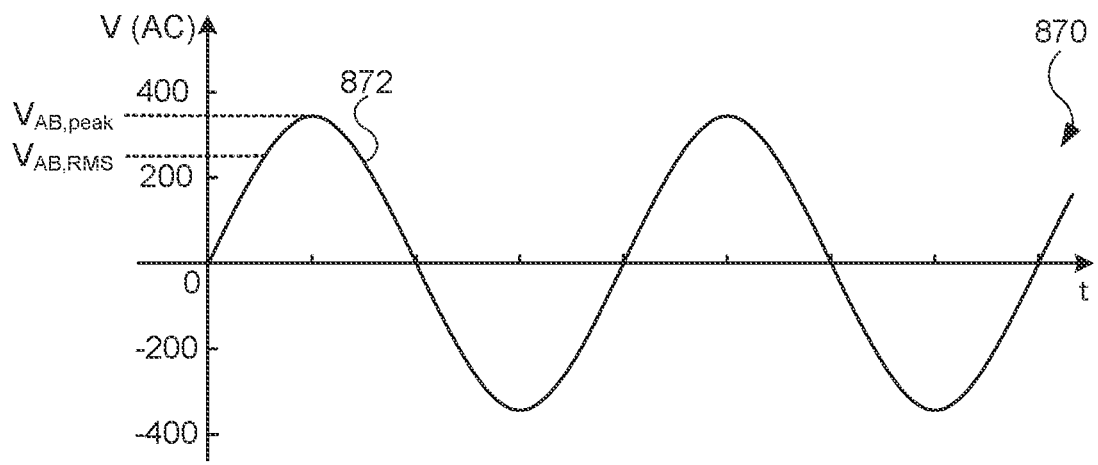
FIG. 8 illustrates a graph showing a curve for a line-to-line voltage, in accordance with aspects of the present disclosure.

FIGS. 6-8 illustrate graphs showing voltage over time from, for example, the AC outputs shown in FIG. 5. Each of the respective graphs illustrate curves with sinusoidal waveforms. Referring to FIG. 6, a graph 670 illustrates a curve 672 showing line-to-neutral voltage. The line-to-neutral voltage (e.g., differential between a line voltage and neutral) may represent $V_A$ shown in FIG. 5. As shown, a peak voltage ($V_{AN.peak}$) is approximately 170 VAC and a root mean square (RMS) voltage ($V_{AN.RMS}$) is approximately 120 VAC.

Referring to FIG. 7, a graph 770 illustrates a curve 772 showing line-to-neutral voltage. The line-to-neutral voltage may represent VB shown in FIG. 5. As shown, a peak voltage ($V_{BN.peak}$) is approximately 170 VAC, and an RMS voltage ($V_{BN.RMS}$) is approximately 120 VAC. Further, FIGS. 6 and 7 show the voltages $V_A$ and $V_B$ are 180 degrees out of phase.

Referring to FIG. 8, a graph 870 illustrates a curve 872 showing line-to-line voltage. The line-to-line voltage (e.g., differential between two line voltages) may represent $V_{AB}=V_{AN}-V_{BN}$ shown in FIG. 5. The line-to-line voltage also represents a difference between the curves 672 and 772 shown in FIGS. 6 and 7, respectively. Based on the voltages $V_{AN}$ and $V_{BN}$ being 180 degrees out of phase, the peak and RMS voltage for the line-to-line voltage is doubled. As shown, a peak voltage ($V_{AB.peak}$) is approximately 340 VAC and an RMS voltage ($V_{AB.RMS}$) is approximately 240 VAC.

Figure 9:
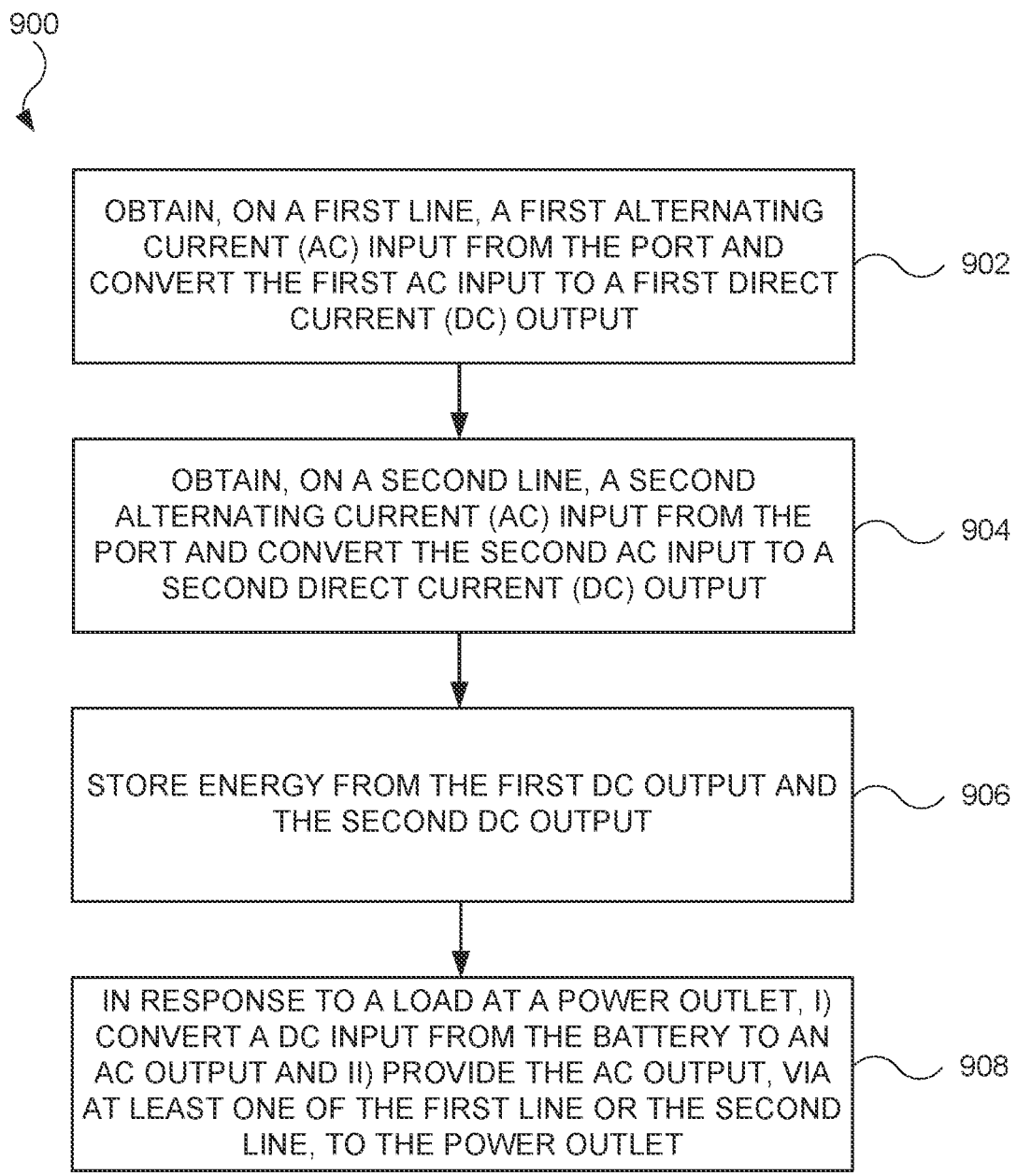
FIG. 9 illustrates a flowchart showing a method for providing power, in accordance with aspects of the present disclosure.

Referring to FIG. 9, a flowchart 900 showing a method for providing power is shown. The steps of the flowchart 900 may be implemented by an apparatus (e.g., vehicle, standalone battery pack in a building) described herein, and in particular, using a power stage circuit described herein. Using the flowchart 900, the apparatus may convert a DC voltage from a battery pack to an AC voltage and provide the AC voltage to a power outlet of the apparatus. Based on the steps shown and described in the flowchart 900, an apparatus may generate 120 VAC L1-N (e.g., line 562a, in FIG. 5, with respect a neutral N) and 120 VAC L2-N (e.g., line 562b, in FIG. 5, with respect a neutral N), or AC split phase power (e.g., 120 VAC L1-N, 120 VAC L2-N, and 240 VAC L1-L2).

At step 902, a first AC current input is obtained on a first line and converted to a first DC output. For example, a power stage circuit of an apparatus may be coupled (e.g., electrically coupled) to a power grid and may receive an AC voltage from the power grid.

At step 904, a second AC input is obtained on a second line and converted to a second DC output. Similar to the first AC input, the power stage circuit may receive an AC voltage from the power grid. In some embodiments, the apparatus includes a port (e.g., charge port) designed to connect the apparatus to the power grid to receive the AC voltage.

At step 906, energy from the first DC output and the second DC output is stored. In some embodiments, the first DC output and the second DC output is stored in a battery pack of the apparatus.

At step 908, in response to a load at a power outlet (e.g., an appliance being plugged into the power outlet), the power stage circuit converts a DC input from the battery pack to an AC output. Additionally, the power stage circuit provides the AC output, via at least one of the first line or the second line, to the power outlet. The AC outlet may include a line-to-neutral voltage (e.g., 120 VAC) or a line-to-line voltage (e.g., 240 VAC), depending upon the requirements of the load. Using multiple AC to DC circuits connected together (e.g., in series), the power stage circuit can provide two line-to-neutral voltage sources that are 180 degrees out of phase with respect to each other, thus producing the line-to-line voltage that is greater than the line-to-neutral voltage.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A. B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. An apparatus, comprising:
   a power stage circuit configured to convert an alternating current (AC) input, received from a port of a vehicle, input to a direct current (DC) output to charge a battery pack, the power stage circuit comprising:
      a first circuit comprising a first totem pole circuit comprising a first set of switches that includes a first switch and a second switch, wherein the first switch and the second switch are configured to switch at a first switching frequency,
      a second circuit comprising a second totem pole circuit comprising a second set of switches that includes a third switch and a fourth switch, wherein the third switch and the fourth switch are configured to switch at the first switching frequency,
      a third circuit comprising a third set of switches that includes a fifth switch configured to switch at a second switching frequency less than the first switching frequency,
      a fourth circuit having a fourth set of switches configured to switch at the first switching frequency,
      a fifth circuit having a fifth set of switches configured to switch at the first switching frequency,
      a sixth circuit having a sixth set of switches configured to switch at the second switching frequency, and
   a first line electrically connected to the first totem pole circuit between the first switch and the second switch;
   a second line electrically connected to the second totem pole circuit between the third switch and the fourth switch; and
   a third line that forms a neutral line electrically coupled to the third circuit and the sixth circuit, wherein:
      in response to a load on the first line, the power stage circuit converts a first DC input from the battery pack to a first AC output at the load,
      in response to the load on the second line, the power stage circuit converts a second DC input from the battery pack to a second AC output at the load,
      the first line and the second line are electrically connected to a power outlet configured to receive the load, the power outlet being separate from the port, and
      the first line and the second line are configured to provide, via the battery pack, at least one of the first AC output or the second AC output to a power grid.

2. The apparatus of claim 1, wherein:
   the first line carries a first AC voltage, and
   the second line carries a second AC voltage that is 180 degrees out of phase with respect to the first AC voltage.

3. The apparatus of claim 2, wherein the first AC voltage is 180 degrees out of phase with respect to the second AC voltage.

4. The apparatus of claim 1, wherein the first line and the second line are electrically connected to a power outlet configured to receive the load.

5. The apparatus of claim 4, wherein the first line and the second line are configured to provide 120 VAC or 240 VAC to the power outlet.

6. The apparatus of claim 1, wherein:
   the first line is connected to a first AC to DC circuit of the power stage circuit, and
   the second line is connected to a second AC to DC circuit of the power stage circuit.

7. The apparatus of claim 6, wherein:
the first AC to DC circuit comprises a third totem pole circuit,
the second AC to DC circuit comprises a fourth totem pole circuit,
the third line is electrically connected to the third totem pole circuit and the fourth totem pole circuit, and
the third line comprises a common neutral line with respect to the first line and the second line.

8. A vehicle, comprising:
a power stage circuit, comprising:
- a first circuit comprising a first totem pole circuit comprising a first set of switches that includes a first switch and a second switch, wherein the first switch and the second switch are configured to switch at a first switching frequency,
- a second circuit comprising a second totem pole circuit comprising a second set of switches that includes a third switch and a fourth switch, wherein the third switch and the fourth switch are configured to switch at the first switching frequency,
- a third circuit comprising a third set of switches that includes a fifth switch configured to switch at a second switching frequency less than the first switching frequency,
- a fourth circuit having a fourth set of switches configured to switch at the first switching frequency,
- a fifth circuit having a fifth set of switches configured to switch at the first switching frequency,
- a sixth circuit having a sixth set of switches configured to switch at the second switching frequency,
- a first line electrically connected to the first totem pole circuit between the first switch and the second switch,
- a second line electrically connected to the second totem pole circuit between the third switch and the fourth switch, and
- a third line that forms a neutral line electrically coupled to the third circuit and the sixth circuit,
the power stage circuit configured to:
  receive, on the first line, a first alternating current (AC) input from an AC power source and convert the first AC input to a first direct current (DC) output, and
  receive, on the second line, a second AC input from the AC power source and convert the second AC input to a second DC output,
  convert, from stored DC energy of a battery pack, a first AC output on the first line and a second AC output on the second line, wherein the battery pack configured to store energy from the first DC output and the second DC output; and
a power outlet, wherein in response to a load at the power outlet, the power stage circuit is further configured to:
  provide the first AC output and the second AC output, via the first line and the second line, respectively, to the power outlet.

9. The vehicle of claim 8, wherein the power stage circuit further comprises:
a first AC to DC circuit connected to the first line; and
a second AC to DC circuit connected to the second line, wherein the first AC to DC circuit and the second AC to DC circuit are connected in series.

10. The vehicle of claim 8, wherein the power stage circuit further comprises:
a third totem pole circuit connected in parallel with the first totem pole circuit; and
a fourth totem pole circuit connected in parallel with the second totem pole circuit.

11. The vehicle of claim 10, wherein the third line is configured to provide a common neutral line with respect to the first line and the second line.

12. The vehicle of claim 8, wherein:
the first line carries a first AC voltage, and
the second line carries a second AC voltage that is 180 degrees out of phase with respect to the first AC voltage.

13. The vehicle of claim 8, wherein the power stage circuit is configured to provide the AC output to a power grid.

14. A power stage circuit, comprising:
a first AC to DC circuit coupled to a battery pack, the first AC to DC circuit comprising:
  a first circuit having a first set of switches configured to switch at a first switching frequency,
  a second circuit having a second set of switches configured to switch at the first switching frequency, and
  a third circuit having a third set of switches configured to switch at a second switching frequency less than the first switching frequency;
a second AC to DC circuit coupled to the battery pack, the second AC to DC circuit comprising:
  a fourth circuit having a fourth set of switches configured to switch at the first switching frequency,
  a fifth circuit having a fifth set of switches configured to switch at the first switching frequency, and
  a sixth circuit having a sixth set of switches configured to switch at the second switching frequency;
a first line electrically coupled to the first circuit;
a second line electrically coupled to the third circuit; and
a third line that forms a neutral line electrically coupled to the third circuit and the sixth circuit.

15. The power stage circuit of claim 14, wherein the first switching frequency is greater than the second switching frequency.

16. The power stage circuit of claim 14, wherein the first AC to DC circuit and the second AC to DC circuit are each configured to convert a DC input from the battery pack to an alternating current (AC) output.

17. The power stage circuit of claim 16, wherein the AC output is provided by:
a first AC voltage on the first line; and
a second AC voltage on the second line, the second AC voltage being 180 degrees out of phase with respect to the first AC voltage.

18. The power stage circuit of claim 14, further comprising:
a first inductor on the first line and electrically coupled to the first AC to DC circuit, and
a second inductor on the second line and electrically coupled to the first AC to DC circuit.

* * * * *